United States Patent
Antonelli et al.

(10) Patent No.: US 10,122,250 B2
(45) Date of Patent: Nov. 6, 2018

(54) ELECTROMECHANICAL TRANSDUCER APPARATUS FOR CONVERTING BETWEEN MECHANICAL ENERGY AND ELECTRICAL ENERGY

(71) Applicant: ETALIM INC., Vancouver (CA)

(72) Inventors: Keith Borthwick Antonelli, Vancouver (CA); Geoffrey Donald Stalker Archibald, Vancouver (CA); Ryan John Biffard, Calgary (CA); Kristjan Tod Gottfried, Vancouver (CA); Douglas Bruce Jelstad, Vancouver (CA); Takao Kanemaru, Port Coquitlam (CA); Briac Medard de Chardon, Vancouver (CA); Sylvia Joan Smullin, Menlo Park, CA (US); Thomas Walter Steiner, Burnaby (CA)

(73) Assignee: ETALIM INC., Vancouver, British Columbia (CA)

( * ) Notice: Subject to any disclaimer, the term of this patent is extended or adjusted under 35 U.S.C. 154(b) by 235 days.

(21) Appl. No.: 15/125,914

(22) PCT Filed: Mar. 12, 2015

(86) PCT No.: PCT/CA2015/000150
§ 371 (c)(1),
(2) Date: Sep. 13, 2016

(87) PCT Pub. No.: WO2015/135064
PCT Pub. Date: Sep. 17, 2015

(65) Prior Publication Data
US 2017/0025940 A1    Jan. 26, 2017

Related U.S. Application Data

(60) Provisional application No. 61/952,431, filed on Mar. 13, 2014.

(51) Int. Cl.
*H02K 35/06* (2006.01)
*H02K 33/12* (2006.01)
(Continued)

(52) U.S. Cl.
CPC ............. *H02K 35/06* (2013.01); *H02K 33/00* (2013.01); *H02K 33/12* (2013.01); *H02K 35/00* (2013.01)

(58) Field of Classification Search
CPC ........ H02K 33/00; H02K 33/12; H02K 33/14; H02K 35/06
See application file for complete search history.

(56) References Cited

U.S. PATENT DOCUMENTS

| 1,906,065 A | 4/1933 | Hoffman |
| 5,180,939 A | 1/1993 | Rosswurm |

(Continued)

FOREIGN PATENT DOCUMENTS

| EP | 2063518 A2 | 5/2009 |
| FR | 1450818 | 6/1966 |

(Continued)

OTHER PUBLICATIONS

International Search Report issued by the Canadian Intellectual Property Office in connection with International Patent Application No. PCT/CA2015/000150.

(Continued)

*Primary Examiner* — Ramon M Barrera

(57) ABSTRACT

An electromechanical transducer apparatus is disclosed and includes a housing. A static portion is substantially immobilized within the housing and includes a magnetic flux generator for generating magnetic flux, a pair of pole pieces for coupling magnetic flux through at least one of a first magnetic circuit and a second magnetic circuit, and a coil disposed to electromagnetically interact with one of the (Continued)

magnetic circuits. The static portion is thermally coupled to the housing via a low thermal resistance path to permit removal of heat. A movable portion includes first and second closing pieces separated from the pole pieces by first and second gaps. The closing pieces are mechanically coupled and supported for reciprocating motion about an equilibrium position which varies the gaps to cause a variation in magnetic reluctance in each of the first and second magnetic circuits.

34 Claims, 5 Drawing Sheets

(51) Int. Cl.
  *H02K 35/00* (2006.01)
  *H02K 33/00* (2006.01)

(56) References Cited

U.S. PATENT DOCUMENTS

| | | |
|---|---|---|
| 5,430,009 A | 7/1995 | Wang |
| 5,896,076 A | 4/1999 | van Namen |
| 6,236,123 B1 | 5/2001 | Pinkerton |
| 8,810,084 B2 * | 8/2014 | Flynn ............... H01F 7/122 310/12.14 |
| 2001/0043450 A1 | 11/2001 | Seale et al. |
| 2010/0033029 A1 | 2/2010 | Lucas Torralba et al. |
| 2011/0133488 A1 | 6/2011 | Roberts et al. |

FOREIGN PATENT DOCUMENTS

| | | |
|---|---|---|
| GB | 1463654 | 2/1977 |
| GB | 2459269 | 10/2009 |

OTHER PUBLICATIONS

Written Opinion of the International Searching Authority issued by the Canadian Intellectual Property Office in connection with International Patent Application No. PCT/CA/2015/000150.

De Haan, Aldert, European Patent Office, Extended European Search Report, in connection with related European Patent Application No. 15761497.5, dated Dec. 8, 2017, 9 pages.

* cited by examiner

ELECTROMECHANICAL TRANSDUCER APPARATUS FOR CONVERTING BETWEEN MECHANICAL ENERGY AND ELECTRICAL ENERGY

BACKGROUND OF THE INVENTION

1. Field of Invention

This invention relates generally to electromechanical transducers and more particularly to an electromechanical transducer for converting mechanical energy to electrical energy and/or electrical energy to mechanical energy.

2. Description of Related Art

Electromechanical transducers are commonly used for energy conversion between mechanical and electrical energy. For example, mechanical motion produced by an external system may be coupled to a moving portion of an electromechanical transducer, and an electrical potential difference will be developed between terminals of the transducer. Alternatively the electromechanical transducer may cause movement of the moving portion in response to receiving a suitable current via the terminals. The motion may be a linear motion, a rotary motion, or a reciprocating motion, for example.

PCT Patent Application Publication WO 2011/003207 by Steiner Thomas W. et al. published on Jan. 13, 2011 and entitled "Stirling Cycle Transducer for Converting between Thermal Energy and Mechanical Energy" discloses a Stirling cycle transducer which may be configured to produce reciprocating motion. In one embodiment the reciprocating motion may have an amplitude of about 200 μm and a frequency of 500 Hz. Conventional electromechanical transducers may not be able to operate efficiently under these drive conditions.

SUMMARY OF THE INVENTION

In accordance with one disclosed aspect there is provided an electromechanical transducer apparatus for converting between mechanical energy and electrical energy. The apparatus includes a housing, and a static portion substantially immobilized within the housing. The static portion includes a magnetic flux generator operable to generate a magnetic flux, a pair of pole pieces operable to couple magnetic flux generated by the magnetic flux generator through at least one of a first magnetic circuit and a second magnetic circuit, and at least one coil operable to carry an electric current and being disposed to electromagnetically interact with at least one of the first and second magnetic circuits. The static portion is thermally coupled to the housing to provide a low thermal resistance path between the static portion and the housing to permit removal of heat generated during operation of the transducer. The apparatus also includes a movable portion including a first closing piece completing the first magnetic circuit and separated from the pair of pole pieces by a first gap, and a second closing piece completing the second magnetic circuit and separated from the pair of pole pieces by a second gap. The first and second closing pieces are mechanically coupled and supported to permit reciprocating motion with respect to the pair of pole pieces about an equilibrium position. The reciprocating motion is operable to vary the first and second gaps such that an increase in one of the first and second gaps causes a corresponding decrease in the other of the first and second gaps, the variation of the first and second gaps causing a variation in magnetic reluctance in each of the first and second magnetic circuits.

The static portion may include a static frame supporting the magnetic flux generator, the pair of pole pieces, and the at least one coil, the static frame being rigidly connected to the housing.

The static frame may include at least one of an extended surface area disposed proximate the housing for reducing thermal resistance between the static portion and the housing, at least a portion fabricated from a high thermal conductivity material, and a thermal compound disposed to reduce thermal resistance for heat transfer via surfaces of the static frame that are rigidly connected to the housing.

The pole pieces may be electrically insulated from the static frame.

The at least one coil may be operable to receive an electrical current from an external electrical energy source and to cause an electromagnetically induced magnetic flux in the first and second magnetic circuits that interacts with the magnetic flux generated by the magnetic flux generator to cause a change in magnetic flux in each of the first and second magnetic circuits resulting in a force being generated between the static portion and the movable portion.

The movable portion may be operably configured to receive an external mechanical force for driving the reciprocating motion and the variation in reluctance in each of the first and second magnetic circuits due to the reciprocating motion may cause changes in the magnetic flux passing through the respective first and second magnetic circuits causing an electromagnetically induced electrical potential in the at least one coil.

The first and second gaps may be dimensioned to facilitate an amplitude of reciprocating motion of about 0.25 millimeters.

The apparatus may include one of at least one capacitor in series with the at least one coil, the at least one capacitor providing a reactive impedance component operable to substantially cancel a reactive impedance component of the at least one coil, and an active load circuit providing a variable impedance component in response to a control signal, wherein the control signal is generated to cause the impedance component to substantially cancel the reactive impedance component of the at least one coil.

The first and second closing pieces may be supported by a compliant suspension operable to permit the reciprocating motion.

The compliant suspension may be configured to substantially constrain the reciprocating motion of the closing pieces to a single degree of freedom aligned in a direction that facilitates the variation in the first and second gaps.

The compliant suspension may include a first compliant suspension and may further include a second compliant suspension configured to permit the reciprocating motion while suppressing motion of the closing pieces in degrees of freedom other than the single degree of freedom.

The first compliant suspension may include a tube spring and the second compliant suspension may include a flexure.

The tube spring may include a first cylindrical wall and a second cylindrical wall concentrically located and mechanically coupled to form a folded tube spring and at least one of the first and second cylindrical walls may be flared outwardly proximate the mechanical coupling between the walls.

The compliant suspension may be configured to facilitate reciprocating motion at a frequency of about 500 Hz.

An electromechanical transducer apparatus including two of the electromechanical transducers above may be arranged in a back-to-back configuration on a common axis such that inertial forces due to reciprocating motion of each of the respective electromechanical transducers substantially cancel during operation.

The apparatus may include at least one capacitor in series with the at least one coil of at least one of the electromechanical transducers, and a capacitance of the at least one capacitor may be selected to electrically compensate for differences between the movable portions of the respective electromechanical transducers, and the differences may include one of mechanical stiffness and mass.

The apparatus may include an active load circuit in series with the at least one coil of at least one of the electromechanical transducers, the active load circuit providing a variable impedance in response to a control signal, the control signal being generated to cause the active load to electrically compensate for differences between the movable portions of the respective electromechanical transducers, the differences including one of mechanical stiffness and mass.

The apparatus may include a tuning mass coupled to the movable portion of at least one of the electromechanical transducers, the tuning mass being selected to balance inertial forces due to the respective reciprocating motions of the electromechanical transducers.

The magnetic flux generator may include a permanent magnet.

The permanent magnet may include a plurality of electrically insulated magnetic elements arranged in an array.

The pair of pole pieces may be disposed on either side of the magnetic flux generator and the at least one coil may include a first coil between the pair of pole pieces on one side of the magnetic flux generator, and a second coil between the pair of pole pieces on an opposite side of the magnetic flux generator.

The first and second coils may be connected in series.

At least one of the pole pieces and the closing pieces may include one of an amorphous electrical steel, stacked laminations of an electrical steel having insulation between the laminations, and a ferrite material.

The closing pieces may be rigidly mounted in a movable frame and electrically insulated from the movable frame and the movable frame may include at least one of an extended surface area disposed proximate the housing for reducing thermal resistance between the moving portion and the housing, at least a portion fabricated from a high thermal conductivity material, and a thermal compound disposed to reduce thermal resistance for heat transfer from the closing pieces to the movable frame.

The closing pieces may have dovetail shaped mounting surfaces and the movable frame may be configured to engage the dovetail shaped mounting surfaces to rigidly mount the closing pieces in the movable frame.

The dovetail shaped mounting surfaces may be disposed distal to regions of the closing piece through which a substantial portion of the magnetic flux flows during operation of the transducer.

The apparatus may include a clamp operable to urge the dovetail shaped mounting surfaces of the closing pieces into engagement with a corresponding dovetail shaped surface of the movable frame such that a frictional force due to engagement between the corresponding dovetail surfaces exceeds forces experienced by the closing piece during reciprocating motion.

The housing may include a sealed housing.

The sealed housing may enclose at least one of: a gas including at least one of hydrogen and helium, and a gas at reduced operating pressure.

In accordance with another disclosed aspect there is provided an apparatus for converting between mechanical energy and electrical energy, the apparatus including a plurality of the electromechanical transducers as defined above arranged about a central axis, the at least one coil being common to each of the plurality of the electromechanical transducers and disposed to electromagnetically interact with at least one of the first and second magnetic circuits associated with each of the plurality of electromechanical transducers.

The plurality of electromechanical transducers may include three electromechanical transducers arranged in a delta configuration about a central axis.

The apparatus may include a common shaft disposed along the central axis and the closing pieces of each of the electromechanical transducers may be coupled to the common shaft.

The static portions of each of the plurality of the electromechanical transducers may include a common frame for mounting the respective magnetic flux generators, pairs of pole pieces, and the at least one coil.

The movable portions of each of the plurality of the electromechanical transducers may include a common movable frame for mounting the respective closing pieces.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
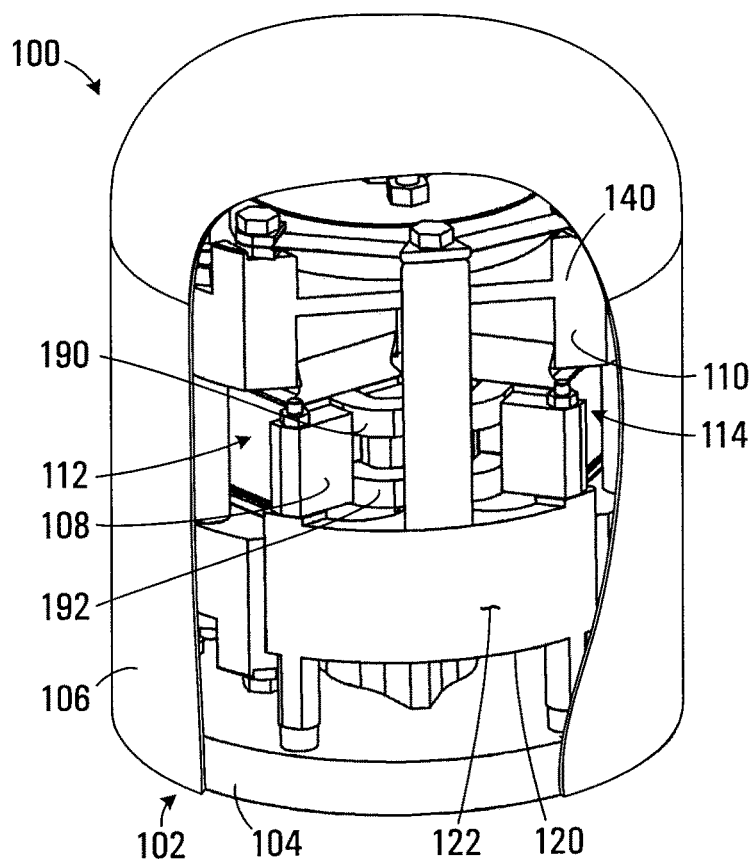
FIG. 1 is a perspective view of an electromechanical transducer apparatus according to a first embodiment.

Referring to FIG. 1, an electromechanical transducer apparatus according to a first embodiment is shown generally at 100. The apparatus 100 is operable to convert between mechanical energy and electrical energy and includes a housing 102. In this embodiment the housing 102 includes a base 104 and a cover 106. The apparatus 100 also includes a static portion 108 and a movable portion 110. The static portion 108 is substantially immobilized within the housing 102 and in the embodiment shown the movable portion 110 is nested within the static portion. In this embodiment the apparatus 100 includes a plurality of electromechanical transducer elements, of which first and second elements 112 and 114 are clearly visible in FIG. 1. The apparatus 100 also includes a third electromechanical transducer element located generally behind the first and second elements 112 and 114 in FIG. 1.

Figure 2:
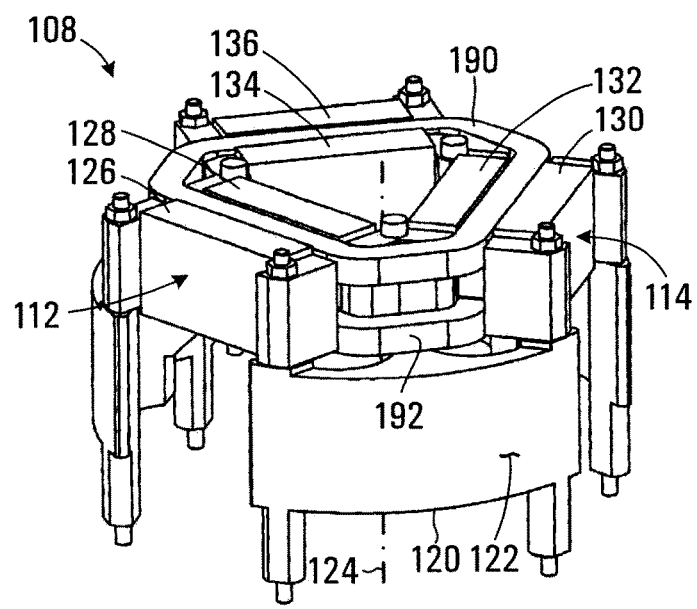
FIG. 2 is a perspective view of a static portion of the apparatus shown in FIG. 1.

The static portion 108 is shown separated from the movable portion 110 in FIG. 2. Referring to FIG. 2 the static portion 108 includes static portions of each of the electromechanical transducer elements 112 and 114 shown in FIG. 1. The static portions include pole pieces 126 and 128 of the transducer element 112, pole pieces 130 and 132 of the transducer element 114, and pole pieces 134 and 136 of the third electromechanical transducer element. The pole pieces 126, 128, 130, 132, 134, and 136 are supported within a static frame 120. The static frame 120 is substantially immobilized within the housing 102, by rigidly connecting the static frame to the base 104 of the housing, for example. The static portion 108 is also thermally coupled to the housing 102 to provide a low thermal resistance path between the static portion and the housing to permit removal of heat generated during operation of the transducer. The static portion 108 also includes a pair of coils 190 and 192. In one embodiment the coils 190 and 192 may be connected in series. In other embodiments the coils 190 and 192 may be connected in parallel, independently connected, or either one of the coils may be omitted. The coils 190 and 192 may also be encapsulated within a potting compound to provide mechanical robustness and to improve heat conduction to the static frame 120 and through the static frame to the housing 102.

Figure 3:
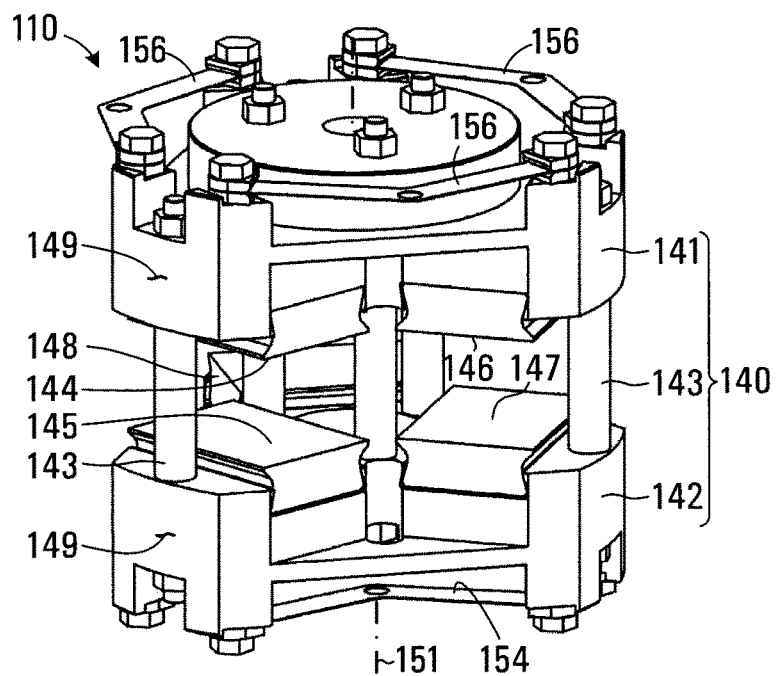
FIG. 3 is a perspective view of a movable portion of the apparatus shown in FIG. 1.

The movable portion 110 is shown separated from the static portion 108 in FIG. 3. Referring to FIG. 3 the movable portion 110 includes movable portions of each of the electromechanical transducer elements shown in FIG. 1, which are supported within a common movable frame 140. In this embodiment, the movable frame includes an upper portion 141 and a lower portion 142 spaced apart by a plurality of posts 143. The movable portions of the electromechanical transducer elements include closing pieces 144 and 145 of the transducer element 112, closing pieces 146 and 147 of the transducer element 114, and closing pieces of the third electromechanical transducer element, of which only a portion of a closing piece 148 is visible in FIG. 3. The movable portion 110 also includes extended surface areas 149 which are disposed close to the cover 106 of the housing 102 and thus provide a large surface area for heat transfer to the cover 106 (shown in FIG. 1).

Figure 4:
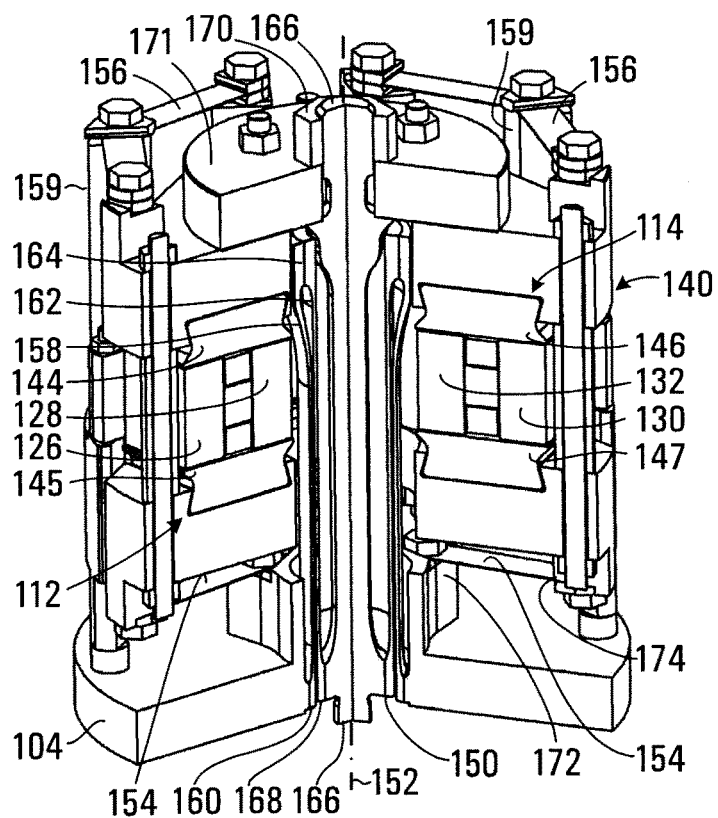
FIG. 4 is a cut-away perspective view of the apparatus shown in FIG. 1.

The movable portion 110 of the apparatus 100 is shown nested within the static portion 108 in a cut-away perspective view in FIG. 4. Referring to FIG. 4, the movable frame 140 is supported by a compliant suspension, which supports the movable frame at an equilibrium position and permits reciprocating motion about the equilibrium position in a direction generally aligned with a common axis 152. In this embodiment, the compliant suspension includes a first compliant suspension 150 and a second compliant suspension including lower flexures 154 and upper flexures 156.

In the embodiment shown, the first compliant suspension 150 is implemented using a tube spring, which is configured to elastically deform to permit the reciprocating motion along the common axis 152. The tube spring includes a first cylindrical wall 158 having an end 160 mechanically coupled to the base 104 and a second cylindrical wall 162 concentrically located with respect to the first cylindrical wall and mechanically coupled to the first cylindrical wall at 164 to form a folded tube spring. The first cylindrical wall 158 is flared outwardly proximate the mechanical coupling 164 to reduce stresses in the tube spring. The second cylindrical wall 162 is mechanically coupled to a shaft 166 at an end 168 of the second cylindrical wall. The shaft is in turn mechanically coupled to the movable frame 140 and provides for input of an external mechanical force for driving the reciprocating motion or for output of mechanical energy depending on the operating configuration of the apparatus 100. In the embodiment shown the shaft 166 is mechanically coupled to the movable frame 140 via an annular disk 171. The shaft 166 is coupled to the annular disk 171 using a fastener 170, but in other embodiments the shaft may be welded or otherwise coupled to the movable frame 140. The annular disk 171 is in turn coupled to the movable frame 140 and the tube spring is thus ultimately coupled between the base 104 and the movable frame 140 and provides the first compliant suspension 150. The tube spring implementation of the first compliant suspension 150 has the advantage of providing a relatively stiff suspension for supporting the movable frame 140 at the equilibrium position, while providing for reciprocating motion due to the compliance of the first cylindrical wall 158 and second cylindrical wall 162 of the tube spring. In one embodiment the compliant suspension is configured to facilitate reciprocating motion of the movable frame 140 at a frequency of about 500 Hz. For example, the apparatus 100 may be configured for operation at a particular frequency by selecting a mechanical resonance of the combined compliant suspension, movable frame 140, and an effective load mass on the shaft 166 to be in the region of the particular operating frequency.

In the embodiment shown, the second compliant suspension 154, 156 functions to substantially constrain the reciprocating motion of the movable frame 140 to a single degree of freedom generally aligned with the common axis 152 while preventing motion in degrees of freedom other than the single degree of freedom. The second compliant suspension 154, 156 includes a plurality of flexures of which two lower flexures 154 and two upper flexures 156 are visible in FIG. 4. The flexures 154 are coupled between a portion 172 of the base 104 and a portion 174 of the movable frame 140. The flexures 156 are coupled between the movable frame 140 and extensions 159 of the static frame 120. The flexures 154 and 156 are configured to provide significantly greater compliance than the first compliant suspension 150 in the direction of the common axis 152 while resisting motion in other directions. The second compliant suspension 154, 156 thus acts to suppress twisting or other angular motions of the movable frame 140 that may otherwise be permitted by the first compliant suspension 150.

Figure 5:
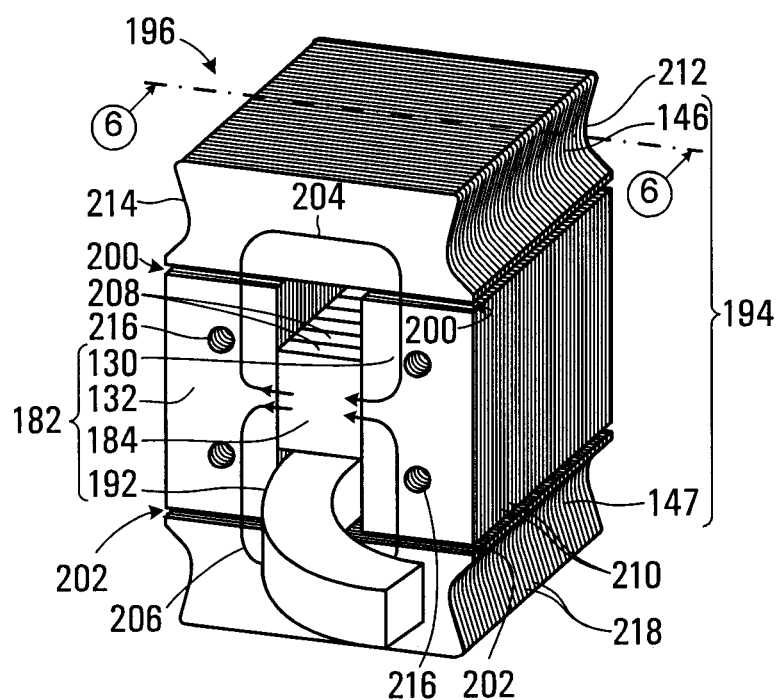
FIG. 5 is a perspective view of a single electromechanical transducer element of the apparatus shown in FIG. 1.

Magnetic and electrical components for implementing any of the first, second, and third electromechanical transducer elements are shown in perspective view at 196 in FIG. 5. The transducer elements 112, 114 and the third transducer element are substantially identical to the transducer element 196 shown in FIG. 5. Referring to FIG. 5, the electromechanical transducer element 196 includes a static portion 182 including a magnetic flux generator 184 and the pair of pole pieces 130 and 132. The static portions 182 of the electromechanical transducer element 196 also include a pair of coils 190 and 192, of which only a portion of the coil 192 is shown in FIG. 5.

In one embodiment the magnetic flux generator 184 may include a permanent magnet such as a sintered high temperature Neodymium/Iron/Boron magnet. In the embodiment shown the magnetic flux generator 184 includes a plurality of individually insulated Neodymium/Iron/Boron magnets 208 bonded together in an array to form the magnetic flux generator 184. In other embodiments the magnetic flux generator 184 may be implemented using a unitary magnet.

In one embodiment the pole pieces 130 and 132 are fabricated using laminations 210 of electrical steel that are insulated from each other to reduce eddy current losses. The laminations 210 may be clamped to pre-stress the laminations in a stack. In other embodiments the pole pieces 130 and 132 may be fabricated from amorphous electrical steel or a ferrite material, for example. In the embodiment shown in FIG. 5, the pole pieces 130 and 132 also each include holes 216 through a face of each pole piece for receiving an insulated fastener (not shown) for securely fastening the pole pieces to the static frame 120. The fasteners may also provide a preload for pre-stressing the laminations 210. In one embodiment the pole pieces 130 and 132 are also electrically insulated from the static frame 120 to eliminate eddy currents between pole pieces and the static frame.

The electromechanical transducer element 196 also includes a movable portion 194. The movable portion 194 includes the first closing piece 146 separated from the pair of pole pieces 130 and 132 by a first gap 200 and the second closing piece 147 separated from the pair of pole pieces by a second gap 202.

Figure 6:
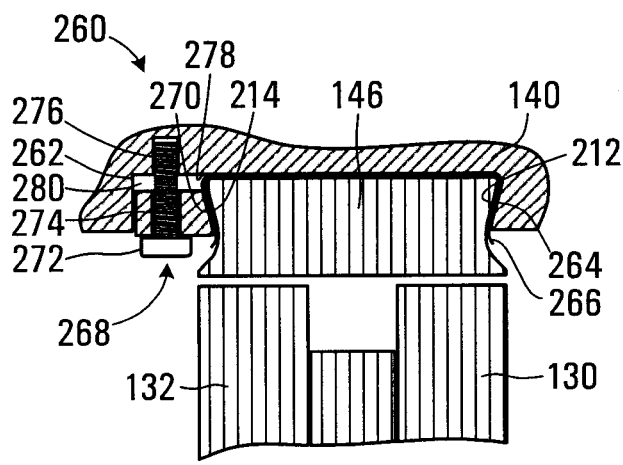
FIG. 6 is a partial sectional view of the electromechanical transducer element taken along the line 6-6 in FIG. 5.

In the embodiment shown in FIG. 5 the closing pieces 146 and 147 have generally dovetail shaped side surfaces 212 and 214. A mounting embodiment for rigidly mounting the closing pieces 146 and 147 in the movable frame 140 (shown in FIG. 3) using dovetail mounting surfaces is shown at 260 in FIG. 6. Referring to FIG. 6, a portion of the movable frame 140 includes a recess 262 having mounting surfaces including a dovetail shaped mounting surface 264 corresponding to the dovetail shaped side surface 212 of the closing piece 146. The mounting 260 also includes a clamp 268 having a dovetail shaped mounting surface 270 corresponding to the dovetail shaped side surface 214 of the closing piece 146. An insulating sheet 266, such as Dupont™ Nomex®, mica or paper may be placed between the closing piece 146 the mounting surfaces of the recess 262 and the clamp 268 to electrically insulate the closing piece from the movable frame 140 to eliminate eddy currents between the closing piece and the frame 140, which may be fabricated from a conducting metal such as aluminum. In this embodiment the clamp 268 includes a through-hole 274 for receiving a threaded fastener 272, which is received in a threaded hole 276 in the movable frame 140. When the fastener 272 is tightened the dovetail shaped mounting surface 270 of the clamp 268 engages the surface 214 and also forces the side surface 212 of the closing piece 146 into contact with the mounting surface 264 while at the same time forcing the closing piece 146 toward a base 278 of the recess 262. The clamp 268 is configured to provide a gap 280 between the base 278 of the recess 262 and the clamp when the clamp is fully engaged so that the clamp does not bottom out before the closing piece 146 is secured within the recess. The clamp 268 is thus operable to urge the dovetail shaped mounting surfaces 212 and 214 of the closing piece 146 into engagement with the corresponding dovetail shaped surface 264 of the movable frame 140 and dovetail shaped surface 270 of the clamp 268. In one embodiment the frictional forces due to engagement between the corresponding dovetail surfaces exceed forces experienced by the first closing piece during reciprocating motion of the movable frame 140. Advantageously, the dovetail shaped mounting surfaces 212, 214 are disposed distal to regions of the closing piece 146 through which a substantial portion of the magnetic flux flows during operation of the apparatus 100 so that the flux density is low in the most highly stressed regions of the closing piece 146.

In other embodiments the clamp 268 may be substituted by other fastening mechanisms, such as for example one or more screws pushing on the back of the closing piece 146 and forcing the closing piece against a dovetail shaped cutout.

In the embodiment shown in FIG. 5 the closing pieces 146 and 147 are fabricated using laminations 218 of electrical steel that are insulated from each other to reduce eddy current losses. The laminations 218 may be pre-stressed. In other embodiments the closing pieces 146 and 147 may be fabricated from amorphous electrical steel or a ferrite material, for example.

The magnetic flux generator 184 is operable to generate a magnetic flux and the pole pieces 130 and 132 are operable to couple magnetic flux generated by the magnetic flux generator through a first magnetic circuit 204 and/or a second magnetic circuit 206. The first magnetic circuit 204 couples magnetic flux generated by the magnetic flux generator 184 through the pole piece 132, through the gap 200, through the first closing piece 146 and back through the gap and pole piece 130 to the magnetic flux generator. The second magnetic circuit 206 couples magnetic flux generated by the magnetic flux generator 184 through the pole piece 132, through the gap 202, through the second closing piece 147 and back through the gap and pole piece 130 to the magnetic flux generator. The first closing piece 146 thus completes the first magnetic circuit 204 and the second closing piece 147 completes the second magnetic circuit 206. In this embodiment, the pole pieces 130 and 132 and the closing pieces 146 and 147 provide substantially the same area for coupling magnetic flux. The reluctance of the first gap 200 and second gap 202 is dependent on the size of the respective gaps. When there is no current flowing in the coils 190 and 192 and when the first and second gaps are the same, substantially the same average flux density would flow through each of the first and second magnetic circuits 204 and 206.

The first and second closing pieces 146 and 147 are mechanically coupled and supported by the movable frame 140 (as best shown in FIG. 4) to permit reciprocating motion with respect to the pair of pole pieces 130 and 132 about an equilibrium position. Still referring to FIG. 5, the reciprocating motion is operable to vary the first and second gaps 200 and 202 such that an increase in one of the first and second gaps causes a corresponding decrease in the other of the first and second gaps. The variation of the first and second gaps 200 and 202 cause a corresponding variation in magnetic reluctance in each of the first and second magnetic circuits 204 and 206. When the coils 190 and 192 are supplied with an electric current an additional magnetic flux is generated, which interacts with the magnetic flux in the first and second magnetic circuits 204 and 206 generated by the magnetic flux generator 184.

Figure 7:
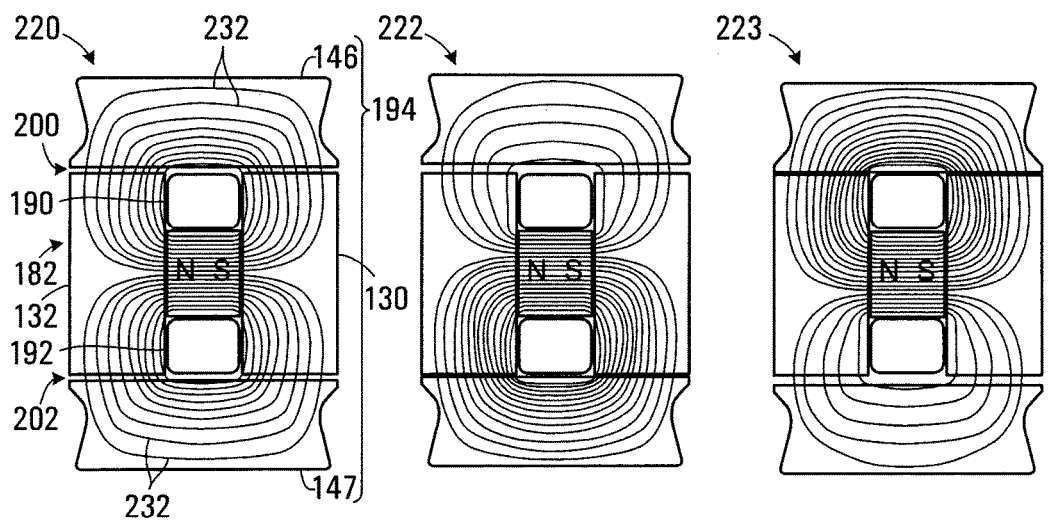
FIG. 7 are a series of views depicting operational states of the single electromechanical transducer element shown in FIG. 5 when operating in a generator mode with no current being drawn.

The apparatus 100 may be configured to act in a generator mode for converting mechanical energy to electrical energy by receiving input of an external mechanical force at the shaft 166 and causing an electrical potential difference to be generated across the coils 190 and 192. Referring to FIG. 7, the single electromechanical transducer element 196 (shown in FIG. 5) is shown schematically in three different operational states 220, 222, and 223 associated with operation in the generator mode. While only three operational "states" are shown in FIG. 7, it should be understood that in practice the external mechanical force would have a generally sinusoidal variation with time and the movable portion 194 of the electromechanical transducer element 196 would thus move continuously between states. The depicted operational states 220, 222, and 223 thus represent the state of the electromechanical transducer element 196 at three distinct times.

In the first operational state 220 the movable portion 194 is shown disposed in an equilibrium position by the compliant suspension with respect to the static portion 182 and the first and second gaps 200 and 202 are substantially the same. Under these conditions, the magnetic reluctance in each of the first magnetic circuit 204 and second magnetic circuit 206 is substantially the same and the magnetic flux generated by the magnetic flux generator 184 (indicated by magnetic field lines 232) divides into two substantially similar portions through the respective magnetic circuits. The magnetic flux thus distributes substantially equally between the first and second magnetic circuits and a force is generated across each gap 200 and 202 between the respective closing pieces 146 and 147 and the pole pieces 130 and 132. When no external mechanical force is applied to the movable portion 194 the forces between the respective closing pieces 146 and 147 and the pole pieces 130 and 132 will be substantially similar. However, even a very small difference in reluctance between the first and second magnetic circuits 204 and 206 would cause increased force generation in the magnetic circuit having lesser reluctance thus tending to reduce the corresponding gap and further reduce the reluctance. In the embodiments shown, the compliant suspension is configured to provide a restorative force for deflections from the equilibrium position that is larger than forces generated by any flux differences between the magnetic circuits 204 and 206, thus preventing either of the first and second gaps 200 and 202 from closing.

In the second operational state 222 an external force applied to the movable portion 194 via the shaft 166 causes the first gap 200 to increase while the second gap 202 is reduced resulting in a variation in reluctance in each of the first and second magnetic circuits. The change in reluctance causes corresponding changes in the magnetic flux passing through the respective first and second magnetic circuits 204 and 206 and the change in magnetic flux with respect to time results in an electrical potential being electromagnetically induced in the coils 190 and 192 during the transition from state 220 to state 222.

In the third operational state 223 the movable portion 194 has been displaced such that the first gap 200 is reduced while the second gap 202 has been correspondingly increased thus causing a corresponding reduction in magnetic reluctance in the first magnetic circuit 204 and an increase in magnetic reluctance in the second magnetic circuit 206. The change in reluctance causes corresponding changes in the magnetic flux passing through the respective first and second magnetic circuits 204 and 206. The transition from state 220 to 223 results in an electrical potential in coils 190 and 192 of opposite polarity to the electrical potential induced during the transition from state 220 to 222.

For a generally sinusoidal time variation of the external force, the resulting induced electrical potential in the coils 190 and 192 has a generally sinusoidal waveform of the same frequency but shifted in phase with respect to the external force. The induced electric potential results in current flow through coils 190 and 192 when the coils are connected to an external electrical load.

Figure 8:
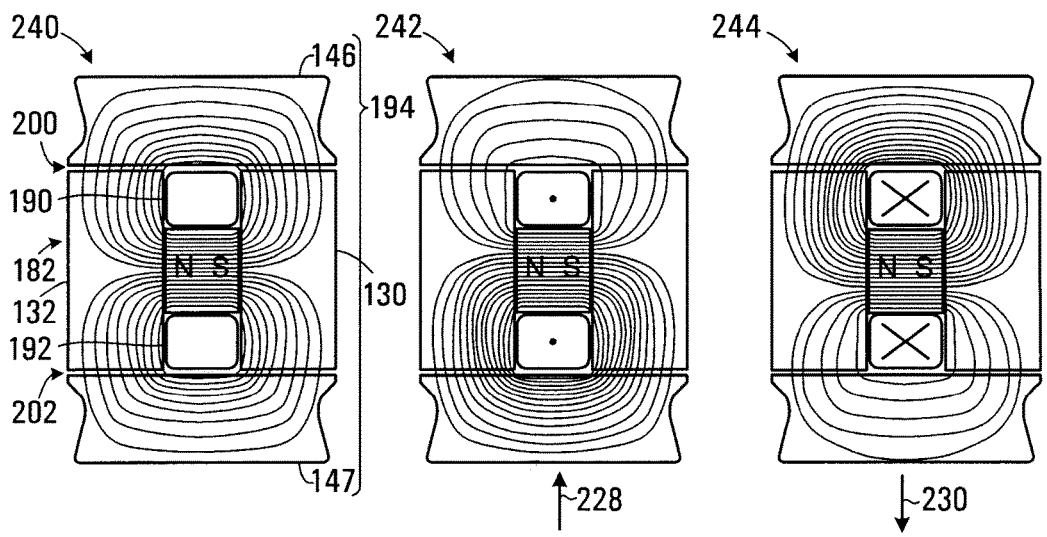
FIG. 8 are a series of views depicting operational states of the single electromechanical transducer element shown in FIG. 5 when operating in a motor mode when driven by an external current.

Alternatively, the apparatus 100 may also be configured to act as a reciprocating motor for converting electrical energy to mechanical energy by connecting an alternating current from an external source through the coils 190 and 192 thereby causing reciprocating motion of the shaft 166. Referring to FIG. 8, the single electromechanical transducer element 196 (shown in FIG. 5) is shown schematically in three different operational states 240, 242, and 244 associated with operation in the motor mode.

In the first operational state 240, no current is flowing through the coils 190 and 192 and the compliant suspension provides a restorative force for deflections from the equilibrium position that is larger than forces generated by the magnetic circuits 204 and 206, thus preventing either of the first and second gaps 200 and 202 from closing. For a sinusoidal current supply the operational state 240 would thus correspond to a zero-crossing state of the current.

In the second operational state 242, a current flows through the coils 190 and 192 in a direction out of the page causing an electrically induced magnetic flux that flows through the pole piece 132, the closing piece 147, the pole piece 130, and the closing piece 146. The electrically induced magnetic flux interacts with the magnetic flux generated by the magnetic flux generator 184. The electrically induced magnetic flux is in an opposite sense to the magnetic flux due to the magnetic flux generator 184 in the first magnetic circuit 204 and thus reduces the flux in the first magnetic circuit. Similarly the electrically induced magnetic flux is in the same sense as the magnetic flux due to the magnetic flux generator 184 in the second magnetic circuit 206 and thus enhances the flux in the second magnetic circuit. The resulting changes in magnetic flux due to the current flow through the coils 190 and 192 cause a force to be generated on the movable portion in a direction indicated by the arrow 228.

In the third operational state 244, a current flows through the coils 190 and 192 in a direction into the page causing an electrically induced magnetic flux that flows through the pole piece 130, the closing piece 146, the pole piece 132, and the closing piece 147. The electrically induced magnetic flux is in the same sense as the magnetic flux due to the magnetic flux generator 184 in the first magnetic circuit 204 and thus enhances the flux in the first magnetic circuit. Similarly the electrically induced magnetic flux is in an opposite sense to the magnetic flux due to the magnetic flux generator 184 in the second magnetic circuit 206 and thus reduces the flux in the second magnetic circuit. The resulting changes in magnetic flux due to the current flow through the coils 190 and 192 cause a force to be generated on the movable portion in a direction indicated by the arrow 230. The forces caused by a current flow in operational states 242 and 244 will result in displacement of the movable portion 194 as permitted by the compliant suspension and external mechanical load.

When the current in the coils 190 and 192 has a sinusoidal time variation the force generated on the movable portion would also have a generally sinusoidal variation with time. The amplitude of the displacement is proportional to the current flow and in one embodiment may be in the region of about 0.25 millimeters.

Whether the apparatus 100 is configured as a motor or a generator, the magnetic flux within the first magnetic circuit 204 and second magnetic circuit 206 varies with time, which causes losses due to hysteresis, eddy currents within the pair of pole pieces 130 and 132 and the closing pieces 146 and 147, flux leakage, and other anomalous losses to surrounding structures. These losses cause heating of the magnetic and surrounding materials. Similarly, current flow through the coils 190 and 192 causes Joule heating of the coils, which increases with the temperature of the coils. For efficient operation, it is thus necessary to limit the operating temperature of the apparatus 100. Additionally, the magnets 208 of the magnetic flux generator 184 also generate less magnetic flux at higher temperatures and if the temperature gets too high, the magnets may become demagnetized. Referring back to FIG. 2, in the embodiment shown the static frame 120 of the static portion 108 is in thermal communication with the pole pieces 126, 128, 130, 132, 134, and 136 and the coils 190 and 192, thus providing a low thermal resistance path for heat transfer to the static frame. The static frame 120 also includes extended surface areas 122, which are disposed close to the cover 106 of the housing 102 and thus provide a large surface area for heat transfer to the cover 106 (shown in FIG. 1). In one embodiment the gap between the surface areas 122 and the cover 106 is about 1 millimeter. The cover 106 has a large surface area for dissipating heat to an environment surrounding the apparatus 100. The static portion 108 thus supports the pole pieces 126, 128, 130, 132, 134, and 136 and the coils 190 and 192 that represent significant sources of heat generation, thus simplifying removal of heat generated during operation of the apparatus 100. Furthermore, since the coils are substantially immobilized within the housing 102 connections to the coils 190 and 192 are not subject to fatigue that could limit the operating life of the apparatus 100. The magnetic flux generator 184 is also not subjected to the high acceleration of the reciprocating motion. In general immobilization prevents damage to delicate components, fatigue, mechanical losses, or lowering the quality factor Q of the resonant system.

Referring to FIG. 3, in this embodiment, the closing pieces 144, 145, 146, 147 and the closing pieces associated with the third electromechanical transducer element are carried in the movable frame 140 of the movable portion 110 and are subjected to the acceleration due to the reciprocating motion. The nested configuration of the movable portion 110 and the static portion 108 shown in FIG. 4 permits heat transfer from the closing pieces of the transducer elements to both the movable frame 140 and the static frame 120 and via the first and second gaps associated with each electromechanical transducer element to the pole pieces 126, 128, 130, 132, 134, and 136. The extended surface areas 149 of the movable portion 110 also permit heat transfer directly to the cover 106.

In some embodiments, the cover 106 is configured to seal an interior volume of the housing 102 to support a gas pressure below atmospheric pressure for operation of the apparatus 100. A rarified environment in the interior volume of the housing 102 is effective in reducing windage losses due to the reciprocating motion of the movable portion 110. The use of low viscosity hydrogen in the sealed volume is also effective in reducing windage losses as it has the lowest viscosity of any gas. The sealed interior volume also reduces transmission of sound whether the environment is rarified or not. Additionally, a sealed interior volume filled with a gas more conductive than air can help with thermal transfer, for example hydrogen or helium or a mixture of hydrogen and helium. In one embodiment the gas in the housing may have a pressure of about $1 \times 10^{-3}$ atmosphere.

Figure 9:
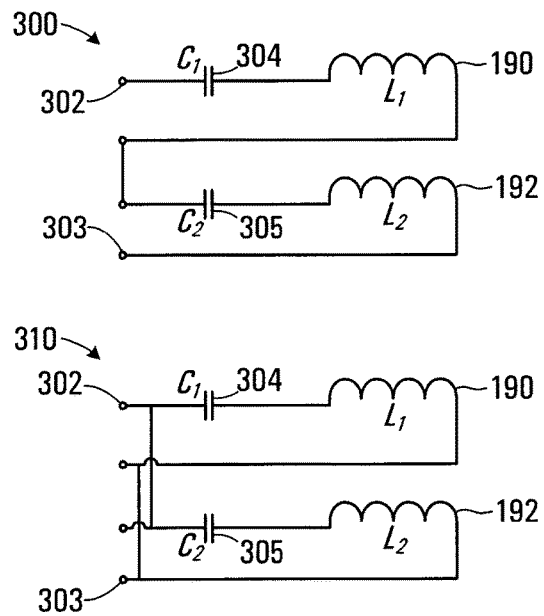
FIG. 9 are schematic diagrams of electrical circuits for implementing the apparatus shown in FIG. 1 in accordance with other embodiments.

Electrical circuits in accordance with another embodiment are shown generally at 300 and 310 in FIG. 9. In the embodiment shown at 300 the coils 190 and 192 are connected in series and have associated inductance values $L_1$ and $L_2$, which will generally be substantially the same. The circuit 300 includes a pair of terminals 302 and 303 for connecting to an external load when operating the apparatus 100 as a generator or for connecting to an external current source when operating as a motor. The circuit 300 also includes a first series capacitor 304 in series with the first coil 190 and a second series capacitor 305 in series with the second coil 192. In the circuit embodiment shown at 310, a pair of terminals 302 and 303 are provided for connecting to an external load or external current source, and the coil 190 and capacitor 304 are connected in parallel with the coil 192 and capacitor 305.

The capacitances $C_1$ and $C_2$ in the circuit embodiments 300 and 310 are selected to provide a reactive impedance component operable to substantially cancel a reactive impedance component of the coils at the operating frequency of the apparatus. For example, in the generator mode, the changing magnetic flux in the first and second magnetic circuits 204 and 206 causes an induced electric potential in the coils 190 and 192. When a load is connected to the pair of terminals 302, 303 the current change through the inductors $L_1$ and $L_2$ causes a voltage drop $(L_1+L_2)di/dt$ that limits the generated voltage at the load terminals and thus limits the current that can be delivered to the load. The capacitances $C_1$ and $C_2$ may thus be selected to cancel the effect of inductance at the operating frequency thus allowing the full generated electrical potential to be developed at the terminals 302, 303 even when current is flowing. Additionally, the inclusion of the capacitors 304 and 305 may also cause the current and induced electric potential to be substantially in phase.

In the embodiment shown in FIG. 1 to FIG. 4, the apparatus 100 includes three of the electromechanical transducer elements 196 arranged in a delta configuration. Referring to FIG. 2 the static portion 108 includes pole piece pairs 126 and 128, 130 and 132, and 134 and 136 mounted within the common static frame 120 about a central axis 124. Referring to FIG. 3, the movable portion 110 similarly includes corresponding closing pieces (of which closing pieces 144, 145 and 146, 147 and 148 are partially visible in FIG. 3) mounted on the common movable frame 140 having a central axis 151. Each of the coils 190 and 192 (shown in FIG. 2) are common to all of the electromechanical transducer elements and disposed to electromagnetically interact with at least one of the first and second magnetic circuits associated with each of the electromechanical transducers. Referring to FIG. 4, in the embodiment shown each of the closing pieces of the electromechanical transducer elements are coupled via the movable frame 140 to the common shaft 166. In the motor operating mode forces generated by each electromechanical transducer element are coupled through the movable frame 140 to the common shaft 166. In the generator operating mode of the apparatus 100, external forces applied to the shaft 166 are coupled through the movable frame 140 to each electromechanical transducer element 196. The movable portion 110 is mounted nested within the static portion 108 such that the axes 151 and 124 are substantially aligned and reciprocating motion occurs substantially along the common axis 152 (shown in FIG. 4).

Advantageously, the delta configuration of the apparatus 100 that includes three electromechanical transducer elements provides a greater energy conversion capacity than would a single electromechanical transducer element. The delta configuration symmetry further provides for efficient use of the interior volume of the housing within electromagnetic and mechanical design constraints, allows for independent stable three-point support of the static portion 108 and movable portion 110, and accommodates the shaft 166 and tube spring (i.e. the first compliant suspension 150 in FIG. 4). In other embodiments the apparatus 100 may be configured to include a single electromechanical transducer element 196, two electromechanical transducer elements, or more than three electromechanical transducer elements.

In one embodiment, the apparatus 100 may be used in conjunction with a thermoacoustic transducer. Thermoacoustic transducers may be configured to operate as a heat engine where thermal energy is received and the transducer converts the thermal energy into mechanical energy, which may be used to drive the shaft 166 of the apparatus 100 for generating electrical energy. Alternatively the apparatus 100 may be configured as a reciprocating motor for providing mechanical energy to a thermoacoustic transducer operating as a heat pump to convert the mechanical energy into a thermal energy transfer from lower temperature to higher temperature.

Figure 10:
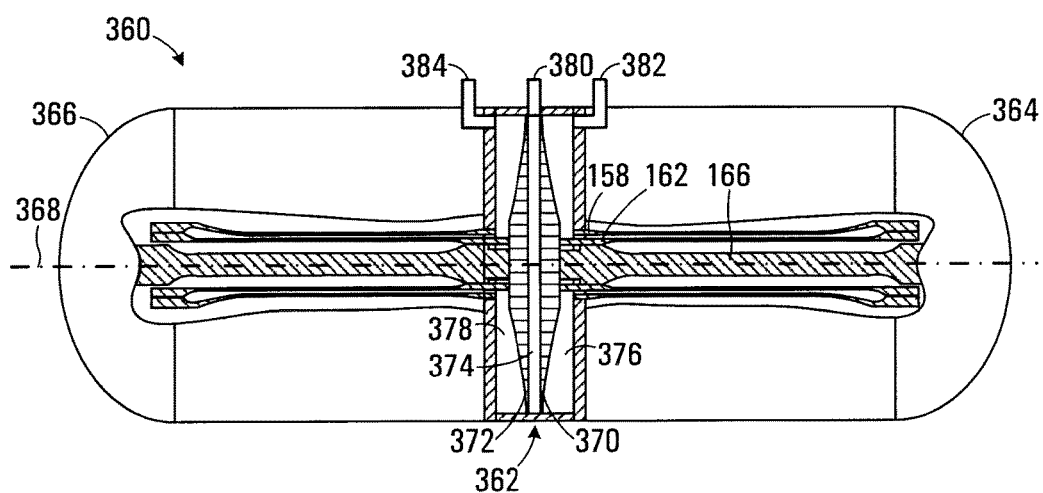
FIG. 10 is a partially cut-away plan view of an energy conversion system in accordance with another embodiment.

An energy conversion system in accordance with another embodiment of the invention is shown in FIG. 10 at 360. Referring to FIG. 10, the energy conversion system 360 includes a thermoacoustic transducer apparatus 362 and two back-to-back electromechanical transducer apparatuses 364 and 366 arranged along a common axis 368. The back-to-back electromechanical transducer apparatuses 364 and 366 may be configured in accordance with the embodiments of the apparatus 100 as described above and as shown in FIG. 1 to FIG. 4.

The thermoacoustic transducer apparatus 362 includes two back-to-back displaceable diaphragms 370 and 372 that define a common central chamber 374 extending between the diaphragms and respective chambers 376 and 378 to either side. The common chamber 374 includes a manifold 380 disposed at a periphery of the common chamber operable to provide fluid communication between the common chamber and a thermal converter (not shown). Each of the chambers 376 and 378 also includes respective manifolds 382 and 384 for providing fluid communication with the thermal converter. The thermoacoustic transducer apparatus 362 is described in detail in a commonly owned U.S. Provisional patent application 61/702,918 entitled "THERMOACOUSTIC TRANSDUCER APPARATUS INCLUDING A TRANSMISSION DUCT" by Steiner et al. filed on Sep. 19, 2012, and which is incorporated herein by reference in its entirety.

A portion of the electromechanical transducer apparatus 364 is shown in partially cut-away view and includes the shaft 166 and cylindrical walls 158 and 162 of the tube spring (shown also in FIG. 4). The shaft 166 and the cylindrical wall 158 are coupled to the diaphragm 370. The tube spring thus establishes an equilibrium position for the shaft 166, which is coupled to both the diaphragm 370 and the movable frame 140 (shown in FIG. 4). The electromechanical transducer apparatus 366 is similarly configured in relation to the diaphragm 372. In operation, inertial forces due to reciprocating motion of each of the respective electromechanical transducers 364 and 366 substantially cancel thus reducing vibration and audible noise of the system 360.

In embodiments of the electromechanical transducers 364 and 366 that include the series capacitors 304 and 305 shown in FIG. 9, the capacitances of the capacitors may be selected to electrically compensate for differences in mechanical stiffness between the movable portions of the respective electromechanical transducers and to more precisely cancel the respective inertial forces. Specifically, the capacitances $C_1$ and $C_2$ may be selected to cause the current to have a phase that either leads the electrical potential or lags the electrical potential. For the case where the current lags the electrical potential, the force produced by the current also lags the electrical potential and provides an additional stiffness component that adds to the stiffness of the compliant suspension. For the case where the current leads the electrical potential, the force produced by the current also leads the electrical potential and effectively adds "mass" to the movable portion 110. Changes to the capacitances $C_1$ and $C_2$ may thus be used to compensate for small differences between the respective electromechanical transducers such that inertial forces are cancelled, thus reducing vibration and audible noise generation.

In another embodiment, the capacitances 304 and 305 may be replaced with active load circuitry (not shown) that effectively provides an impedance component that varies in response to a control signal. One example of an active load circuit is a power factor correction circuit that is operable to vary the phase of the current relative to the voltage. An active load may be configured using a control signal to electronically behave as a capacitor and its effective capacitance can be electronically controlled. In addition an active load may be electronically controlled to vary its effective load resistance and may thus be used to control the transducer stroke. Including separate active loads in the respective electromechanical transducers thus facilitates adjustments in the strokes of the two transducers thus providing an additional control for reducing vibration and audible noise.

Alternatively or additionally, in other embodiments a tuning mass may be coupled to the movable portion of at least one of the electromechanical transducers 364 and 366 to balance inertial forces due to the respective reciprocating motions of the electromechanical transducers. For example, referring to FIG. 4, the mass may be in the form of a washer held on the shaft 166 by the fastener 170. Alternatively, the mass may be introduced in an off-axis position to further compensate for any asymmetry introduced in the manufacturing process. In one embodiment the mass may be selected to provide a coarse balancing of inertial forces while any residual inertial force not compensated by the mass is cancelled by changing the capacitances $C_1$ and $C_2$ as described above.

In the embodiments disclosed, the static portion 108 of the electromechanical transducer apparatus 100 holds the coils in a static position thus simplifying connection to the coils 190 and 192 and reducing possible connection failures that may occur in a moving coil implementation. The static portion 108 also facilitates thermal coupling of significant heat generating components of the apparatus via a low thermal resistance path between the static portion and the housing to permit effective removal of heat generated during operation.

While specific embodiments have been described and illustrated, such embodiments should be considered illustrative only and not as limiting the invention as construed in accordance with the accompanying claims.

What is claimed is:

1. An electromechanical transducer apparatus for converting between mechanical energy and electrical energy, the apparatus comprising:
   a housing;
   a static portion substantially immobilized within the housing, the static portion comprising:
      a magnetic flux generator operable to generate a magnetic flux;

a pair of pole pieces operable to couple magnetic flux generated by the magnetic flux generator through at least one of a first magnetic circuit and a second magnetic circuit,
at least one coil operable to carry an electric current and being disposed to electromagnetically interact with at least one of the first and second magnetic circuits;
the static portion being thermally coupled to the housing to provide a low thermal resistance path between the static portion and the housing to permit removal of heat generated during operation of the transducer;
a movable portion comprising:
a first closing piece completing the first magnetic circuit and separated from the pair of pole pieces by a first gap; and
a second closing piece completing the second magnetic circuit and separated from the pair of pole pieces by a second gap;
the first and second closing pieces being mechanically coupled and supported to permit reciprocating motion with respect to the pair of pole pieces about an equilibrium position, the reciprocating motion being operable to vary the first and second gaps such that an increase in one of the first and second gaps causes a corresponding decrease in the other of the first and second gaps, the variation of the first and second gaps causing a variation in magnetic reluctance in each of the first and second magnetic circuits.

2. The apparatus of claim 1 wherein the static portion comprises a static frame supporting the magnetic flux generator, the pair of pole pieces, and the at least one coil, the static frame being rigidly connected to the housing.

3. The apparatus of claim 2 wherein the static frame comprises at least one of:
an extended surface area disposed proximate the housing for reducing thermal resistance between the static portion and the housing;
at least a portion fabricated from a high thermal conductivity material; and
a thermal compound disposed to reduce thermal resistance for heat transfer via surfaces of the static frame that are rigidly connected to the housing.

4. The apparatus of claim 2 wherein the pole pieces are electrically insulated from the static frame.

5. The apparatus of claim 1 wherein the at least one coil is operable to receive an electrical current from an external electrical energy source and to cause an electromagnetically induced magnetic flux in the first and second magnetic circuits that interacts with the magnetic flux generated by the magnetic flux generator to cause a change in magnetic flux in each of the first and second magnetic circuits resulting in a force being generated between the static portion and the movable portion.

6. The apparatus of claim 1 wherein the movable portion is operably configured to receive an external mechanical force for driving the reciprocating motion and wherein the variation in reluctance in each of the first and second magnetic circuits due to the reciprocating motion causes changes in the magnetic flux passing through the respective first and second magnetic circuits causing an electromagnetically induced electrical potential in the at least one coil.

7. The apparatus of claim 1 wherein the first and second gaps are dimensioned to facilitate an amplitude of reciprocating motion of about 0.25 millimeters.

8. The apparatus of claim 1 further comprising one of:
at least one capacitor in series with the at least one coil, the at least one capacitor providing a reactive impedance component operable to substantially cancel a reactive impedance component of the at least one coil; and
an active load circuit providing a variable impedance component in response to a control signal, wherein the control signal is generated to cause the impedance component to substantially cancel the reactive impedance component of the at least one coil.

9. The apparatus of claim 1 wherein the first and second closing pieces are supported by a compliant suspension operable to permit the reciprocating motion.

10. The apparatus of claim 9 wherein the compliant suspension is configured to substantially constrain the reciprocating motion of the closing pieces to a single degree of freedom aligned in a direction that facilitates the variation in the first and second gaps.

11. The apparatus of claim 10 wherein the compliant suspension comprises a first compliant suspension and further comprises a second compliant suspension configured to permit the reciprocating motion while suppressing motion of the closing pieces in degrees of freedom other than the single degree of freedom.

12. The apparatus of claim 11 wherein the first compliant suspension comprises a tube spring and the second compliant suspension comprises a flexure.

13. The apparatus of claim 12 wherein the tube spring comprises a first cylindrical wall and a second cylindrical wall concentrically located and mechanically coupled to form a folded tube spring and wherein at least one of the first and second cylindrical walls are flared outwardly proximate the mechanical coupling between the walls.

14. The apparatus of claim 9 wherein the compliant suspension is configured to facilitate reciprocating motion at a frequency of about 500 Hz.

15. An electromechanical transducer apparatus including two of the electromechanical transducers of claim 1 arranged in a back-to-back configuration on a common axis such that inertial forces due to reciprocating motion of each of the respective electromechanical transducers substantially cancel during operation.

16. The apparatus of claim 15 further comprising at least one capacitor in series with the at least one coil of at least one of the electromechanical transducers, and wherein a capacitance of the at least one capacitor is selected to electrically compensate for differences between the movable portions of the respective electromechanical transducers, wherein the differences comprise one of mechanical stiffness and mass.

17. The apparatus of claim 15 further comprising an active load circuit in series with the at least one coil of at least one of the electromechanical transducers, the active load circuit providing a variable impedance in response to a control signal, and wherein the control signal is generated cause the active load to electrically compensate for differences between the movable portions of the respective electromechanical transducers, wherein the differences comprise one of mechanical stiffness and mass.

18. The apparatus of claim 15 further comprising a tuning mass coupled to the movable portion of at least one of the electromechanical transducers, the tuning mass being selected to balance inertial forces due to the respective reciprocating motions of the electromechanical transducers.

19. The apparatus of claim 1 wherein the magnetic flux generator comprises a permanent magnet.

20. The apparatus of claim 19 wherein the permanent magnet comprises a plurality of electrically insulated magnetic elements arranged in an array.

21. The apparatus of claim 1 wherein the pair of pole pieces are disposed on either side of the magnetic flux generator and the at least one coil comprises:
 a first coil between the pair of pole pieces on one side of the magnetic flux generator; and
 a second coil between the pair of pole pieces on an opposite side of the magnetic flux generator.

22. The apparatus of claim 21 wherein the first and second coils are connected in series.

23. The apparatus of claim 1 wherein at least one of the pole pieces and the closing pieces comprise one of:
 an amorphous electrical steel;
 stacked laminations of an electrical steel having insulation between the laminations; and
 a ferrite material.

24. The apparatus of claim 1 wherein the closing pieces are rigidly mounted in a movable frame and electrically insulated from the movable frame and wherein the movable frame comprises at least one of:
 an extended surface area disposed proximate the housing for reducing thermal resistance between the moving portion and the housing;
 at least a portion fabricated from a high thermal conductivity material; and
 a thermal compound disposed to reduce thermal resistance for heat transfer from the closing pieces to the movable frame.

25. The apparatus of claim 24 wherein the closing pieces have dovetail shaped mounting surfaces and wherein the movable frame is configured to engage the dovetail shaped mounting surfaces to rigidly mount the closing pieces in the movable frame.

26. The apparatus of claim 25 wherein the dovetail shaped mounting surfaces are disposed distal to regions of the closing piece through which a substantial portion of the magnetic flux flows during operation of the transducer.

27. The apparatus of claim 25 further comprising a clamp operable to urge the dovetail shaped mounting surfaces of the closing pieces into engagement with a corresponding dovetail shaped surface of the movable frame such that a frictional force due to engagement between the corresponding dovetail surfaces exceeds forces experienced by the closing piece during reciprocating motion.

28. The apparatus of claim 1 wherein the housing comprises a sealed housing.

29. The apparatus of claim 28 wherein the sealed housing encloses at least one of:
 a gas comprising at least one of hydrogen and helium; and
 a gas at reduced operating pressure.

30. An apparatus for converting between mechanical energy and electrical energy, the apparatus comprising:
 a plurality of the electromechanical transducers as defined in claim 1 arranged about a central axis; and
 wherein the at least one coil is common to each of the plurality of the electromechanical transducers and disposed to electromagnetically interact with at least one of the first and second magnetic circuits associated with each of the plurality of electromechanical transducers.

31. The apparatus of claim 30 wherein the plurality of electromechanical transducers comprise three electromechanical transducers arranged in a delta configuration about a central axis.

32. The apparatus of claim 30 further comprising a common shaft disposed along the central axis and wherein the closing pieces of each of the electromechanical transducers are coupled to the common shaft.

33. The apparatus of claim 30 wherein the static portions of each of the plurality of the electromechanical transducers comprise a common frame for mounting the respective magnetic flux generators, pairs of pole pieces, and the at least one coil.

34. The apparatus of claim 30 wherein the movable portions of each of the plurality of the electromechanical transducers comprise a common movable frame for mounting the respective closing pieces.

* * * * *